Dec. 21, 1948.                K. E. BEMIS                2,456,810
                         FRENCH FRYING APPARATUS
                         Filed Dec. 23, 1946

INVENTOR.
Kenneth E. Bemis
BY
Philip A. Friedel
Attorney

Patented Dec. 21, 1948

2,456,810

UNITED STATES PATENT OFFICE 2,456,810

FRENCH FRYING APPARATUS

Kenneth E. Bemis, Oakland, Calif.

Application December 23, 1946, Serial No. 717,878

6 Claims. (Cl. 99—406)

This invention relates to improvements in the apparatus for producing French-fried or shoe-string potatoes and introduces a new method of circulation which is of the pulsative type and directly cooperative with the containers to disperse the potato strips during the cooking period so that they will individually fry over their entire superficial surfaces to provide products which are uniformly cooked and of a relatively uniform color throughout. The method and apparatus also causes dispersion and elimination of the steam which is generated from the water contained on the surfaces and within the strips of potatoes and maintains fat at proper frying temperature in constant contact with the strips. Because of this specific circulating method the frying time for either French fried or shoe-string potatoes is reduced 40% over conventional methods and circulating systems, and the product is more uniform in texture, color and flavor.

With conventional methods of circulation most of the strips cling together throughout the cooking period and the areas where they cling will be white after the cooking is completed while those strips which are separate from the main mass or protrude therefrom will be deep brown and actually crisped. This type of French fried or shoe-string potato is completely eliminated by my new system, which assures uniformity in color and cooking since no potato strips can remain in contact with each other during the cooking period and the steam laden fat cannot become quiescent in the mass of strips.

In conventionally preparing French fried or shoe-string potatoes, the fresh potatoes are cut in strips and placed in cold water and allowed to remain there until cooking time when the potatoes are removed and drained, placed in a foraminous container and lowered into the hot fat, which is normally maintained at a suitable frying temperature.

When the potato strips are lowered into the hot fat, they carry a superficial film of water in addition to their water of combination, and through loss of this water in cooking the cooked product has only about 50% the weight of the fresh potatoes.

All of this water is converted into steam and is driven directly into the hot fat, cooling the fat and increasing the cooking time and preventing uniform cooking throughout the mass of strips.

When the container or basket is lowered into the hot fat, the surface water is first converted into steam which cools the fat below the frying temperature so that the potatoes in the center of the mass are merely steamed and therefore remain white, while those on the outer fringes of the mass may start frying almost immediately. After the surface moisture has been evaporated, the water starts cooking out of the potatoes and thus continues to maintain the surrounding fat at too low a temperature to permit frying to take place. Thus the potatoes in the center of the mass and those which adhere closely are merely steamed while the others which are free of each other or protruding from the mass may have been frying almost continuously, resulting in a mixture of steamed and fried potatoes.

With my system this cannot occur as the strips are agitated and dispersed continuously and the fat is simultaneously continuously circulated by a pulsating and multiple direction circulating system which drives the steam laden fat from the immediate vicinity of the strips to allow the high temperature fat to continuously fry the potatoes.

As is well known, thermal circulation of fats is negligible and therefore positive circulation is essential. Continuous uninterrupted circulation such as is created by centrifugal or gear pumps is entirely unsatisfactory, because they merely cause the potato strips to cling together more closely at one end of the container and have no separating or dispersing effect. My system uses pulsating circulation which causes the strips to separate and spread all around the interior of the basket.

The objects and advantages of the invention are as follows:

First, to provide a French fryer with a fat circulating means which will agitate, disperse, and keep separated the individual strips of potatoes during the frying operation.

Second, to provide a method of French frying in which steam generated during the frying operation is rapidly eliminated through impulse circulation of fat within the container for the potatoes.

Third, to provide apparatus for French frying in which circulation is initiated through the container for the potatoes so as to maintain a normal cooking temperature within the mass of potato strips, and in which said circulation is of the impulse type to cause dispersement of the mass.

Fourth, to provide apparatus as outlined with surrounding heating means extending throughout the major portion of the depth of the body of fat so as to heat through conduction because of negligible thermal circulation of fats.

Fifth, to provide apparatus as outlined which is simple in construction and arrangement and convenient to use.

In describing the invention reference will be made to the accompanying drawings in which.

Figure 1:
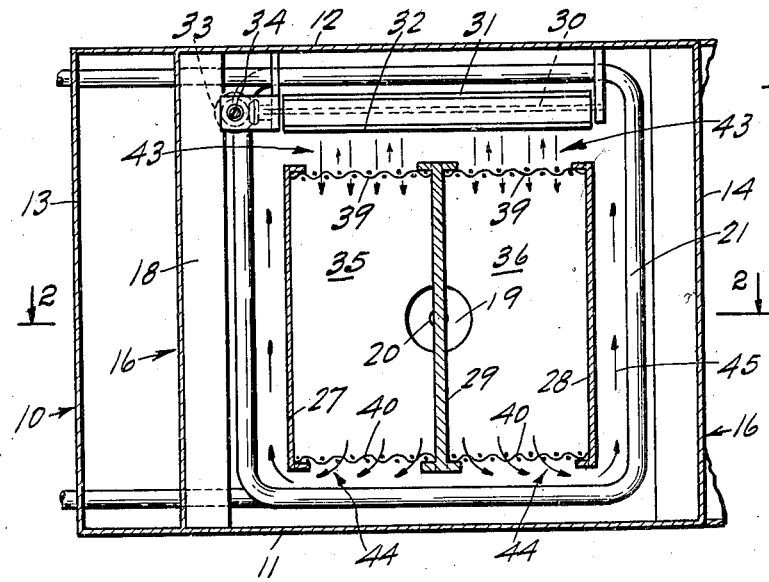
Fig. 1 is a sectional top plan view taken on line 1—1 of Fig. 2.

The invention is related to my application Serial No. 717,877, filed December 23, 1946, for French fryer, and includes a housing 10 having a front wall 11, rear wall 12, and side walls 13 and 14 and a top 15, and formed therein is the container 16 for the cooking fat 17, this container being flared in the upper portion as indicated at 18 to minimize variations in the level of the fat, and is provided with a sump 19 and drain 20 at its lower end. A rectangular spiral heating unit 21 is supported within the container and extends throughout the major portion of the depth of the fat. It will be noted that the front and rear walls of the housing simultaneously function as the front and rear walls of the container. Suitable thermostatic control means 22 is provided for regulating the temperature of the fat, the installation and operation of which, being well known in the art, requires no description.

Removably supported in the upper end of the container is the operating apparatus which includes a cover member 23 the periphery of which is bent down as indicated at 24 and 25 with the lower edges of the depending portions 24 and 25 resting on shelves 26 formed in the side walls of the container. Three walls 27, 28 and 29 are supported at their upper ends by the cover member and extend downwardly to levels below the level 17 to provide two compartments and channels for circulation of the hot fat, the cover member being open between these walls for passage of the baskets.

Also supported by the cover member is a paddle wheel consisting of a shaft 30 carrying a pair of blades 31 and 32 which extend throughout the width of the two compartments formed between the center wall 29 and the two side walls 27 and 28, and this paddle wheel is driven through bevel gears 33 by a drive shaft 34 which in turn is driven at an appropriate speed by a suitable motor and reduction gearing, not shown. This paddle wheel is preferable to a reciprocating pump or the like because it delivers the fat uniformly over the entire width of the basket compartments 35 and 36 instead of at some or certain points as would be the case with any type of distributor used in connection with a pump. It will be understood that any type of pump which delivers under uniform and continuous flow would not be satisfactory as a uniform flow would merely mass the potato strips and thus aggravate the situation. A pulsating current is absolutely essential for best results.

The cover member 23 has two openings 37 and 38 equal in area to the spaces between the baffles or walls 27—29 and 29—28 and between the blocking screens 39 and 40 and the baskets 41 and 42 are supported within these compartments by suitable timed operating means, not shown, but fully disclosed in the related application previously mentioned, and the baskets completely close these openings so that no potato strips can enter the fat receptacle exteriorly of the baskets.

In operation, the baskets are initially in a raised position. After the receptacle 16 has been supplied with a suitable fat or oil, the heating units 21 are energized and the fat is brought up to the proper temperature governed by the thermostat 22. The paddle wheel is then set in operation.

Figure 2:
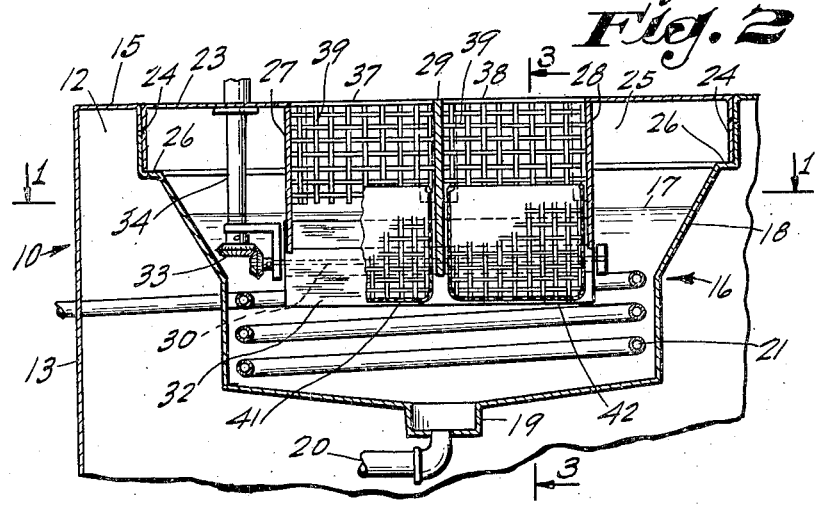
Fig. 2 is a side sectional elevation taken on line 2—2 of Fig. 1.
Figure 3:
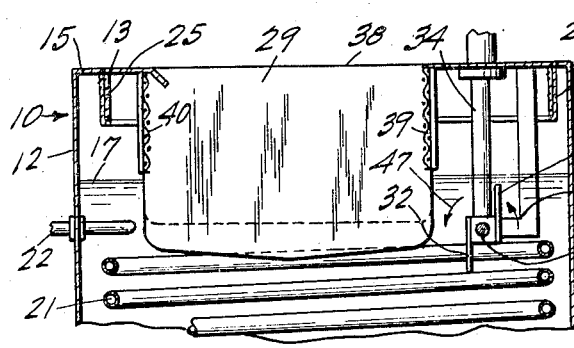
Fig. 3 is a section taken on line 3—3 of Fig. 2.

The drained potato strips are placed in one of the baskets and the basket lowered to the position indicated in Fig. 2. As soon as the potatoes enter the hot fat, steam is generated and consequently under normal processes the steam actually does the cooking within the mass, but in this case the paddles or blades 31 and 32 drive the hot fat through the basket from the rear then withdraws some, as indicated by the arrows 43 in impulses which causes agitation within the basket to disperse the strips so that they all float freely in the fat and are subjected over the entire superficial areas to the hot grease, with the grease which has been cooled by the vaporization of the water being dispatched through the front end of the basket as indicated by the arrows 44, the fat then circulating about the outer baffles as indicated at 45 and also downwardly, while the paddles 31 and 32 draw upward from the heating units for their supply as indicated by the arrow 46, delivering the hottest fat to the baskets, and on the downstroke driving and drawing fat directly in contact with the heating units as indicated by the arrow 47. Thus a very effective action is set up in the fat, including a lifting or drawing action to draw the hot grease from the heating units as the blade moves through the rear quadrant of its circuit, thence a forward push into and through the basket as the blade moves through the top quadrant and followed by a push downward and draw back through the basket and over the top of the paddle wheel through the forward quadrant and a backward push and draw through the under quadrant of the circuit to the heating means. Thus the fat is in constant agitation along the undersurface of the basket and reciprocal within the basket, resulting in constant agitation and dispersion of the potato strips conducted in such manner as to continuously keep the strips exposed to fat at frying temperature and the fat cooled by evaporation of the water continuously replaced by hot fat.

I claim:

1. Deep-fat frying apparatus comprising: a receptacle for the fat and heating means and control means therefor for heating the fat to a frying temperature; foraminous containers for the material to be cooked; and combined circulating means and pulsating means in direct cooperative relation with the foraminous containers when the containers are lowered into the fat for circulating and pulsating the fat within the containers for dispersing the individual portions of materials to be fried and maintaining them in a dispersed condition for continuous frying of the superficial surfaces of the respective portions; said apparatus including two of said foraminous containers and a compartment for each container, said compartments having a common center wall and each having a side wall and being open at the forward and rearward ends and on the bottom, and with said combined circulating and pulsating means located in closely spaced and clearing relation to one of said ends, with the hot fat circulatory path being defined through each container forwardly through the front and bottom and thence about the side walls of the respective compartments.

2. Deep-fat frying apparatus comprising: a receptacle for the fat and heating means and control means therefor for heating the fat to a frying temperature; foraminous containers for the material to be cooked; and combined circulating means and pulsating means in direct cooperative relation with the foraminous containers when the containers are lowered into the fat for circulating and pulsating the fat within the containers for dispersing the individual portions of materials to be fried and maintaining them in a dispersed condition for continuous frying of the superficial surfaces of the respective portions; said apparatus including two of said foraminous containers and a compartment for each container, said compartments having a common center wall and each having a side wall and being open at the forward and rearward ends and on the bottom, and with said combined circulating and pulsating means located in closely spaced and clearing relation to one of said ends, with the hot fat circulatory path being defined through each container forwardly through the front and bottom and thence about the side walls of the respective compartments; said heating means comprising a rectangular spiral heating unit extending throughout not less than half the depth of the fat and surrounding said compartments.

3. Deep-fat frying apparatus comprising: a receptacle for the fat and heating means and control means therefor for heating the fat to a frying temperature; foraminous containers for the material to be cooked; and combined circulating means and pulsating means in direct cooperative relation with the foraminous containers when the containers are lowered into the fat for circulating and pulsating the fat within the containers for dispersing the individual portions of materials to be fried and maintaining them in a dispersed condition for continuous frying of the superficial surfaces of the respective portions; said combined circulating and pulsating means comprising a paddle wheel having a length equal to one horizontal dimension of the containers and having its axis parallel thereto and having blades in clearing relation to the walls of the containers with each blade operating to draw hot fat through one quadrant of its circuit, project the hot fat into and through the container through the second quadrant and partially withdraw fat from the container in its third quadrant and project fat for reheating in the fourth quadrant of its circuit, and driving means for said paddle wheel.

4. Deep-fat frying apparatus comprising; a receptacle for the fat and heating means and control means therefor for heating the fat to a frying temperature; foraminous containers for the material to be cooked; and combined circulating means and pulsating means in direct cooperative relation with the foraminous containers when the containers are lowered into the fat for circulating and pulsating the fat within the containers for dispersing the individual portions of materials to be fried and maintaining them in a dispersed condition for continuous frying of the superficial surfaces of the respective portions; said apparatus including two of said foraminous containers and a compartment for each container, said compartments having a common center wall and each having a side wall and being open at the forward and rearward ends and on the bottom, and with said combined circulating and pulsating means located in closely spaced and clearing relation to one of said ends, with the hot fat circulatory path being defined through each container forwardly through the front and bottom and thence about the side walls of the respective compartments; said combined circulating and pulsating means comprising a paddle wheel having a length equal to one horizontal dimension of the containers and having its axis parallel thereto and having blades in clearing relation to the walls of the containers with each blade operating to draw hot fat through one quadrant of its circuit, project the hot fat into and through the container through the second quadrant and partially withdraw fat from the container in its third quadrant and project fat for reheating in the fourth quadrant of its circuit, and driving means for said paddle wheel.

5. Deep-fat frying apparatus comprising; a receptacle for the fat and heating means and control means therefor for heating the fat to a frying temperature; foraminous containers for the material to be cooked; and combined circulating means and pulsating means in direct cooperative relation with the foraminous containers when the containers are lowered into the fat for circulating and pulsating the fat within the containers for dispersing the individual portions of materials to be fried and maintaining them in a dispersed condition for continuous frying of the superficial surfaces of the respective portions; said apparatus including two of said foraminous containers and a compartment for each container, said compartments having a common center wall and each having a side wall and being open at the forward and rearward ends and on the bottom, and with said combined circulating and pulsating means located in closely spaced and clearing relation to one of said ends, with the hot fat circulatory path being defined through each container forwardly through the front and bottom and thence about the side walls of the respective compartments; said heating means comprising a rectangular spiral heating unit extending throughout not less than half the depth of the fat and surrounding said compartments; said combined circulating and pulsating means comprising a paddle wheel having a length equal to one horizontal dimension of the containers and having its axis parallel thereto and having blades in clearing relation to the walls of the containers with each blade operating to draw hot fat through one quadrant of its circuit, project the hot fat into and through the container through the second quadrant and partially withdraw fat from the container in its third quadrant and project fat for reheating in the fourth quadrant of its circuit, and driving means for said paddle wheel.

6. French frying apparatus comprising; a receptacle for fat and having two compartments having a common center wall and each having a side wall and being open at the front and rear and bottom, and a foraminous container removably supportable in each compartment, and a heating unit surrounding said compartments to uniformly heat fat in the receptacle; pulsative circulating means located in close cooperation and clearing relation with one end of said compartments and including driving means therefor for circulating fat through said compartments and simultaneously pulsating the fat for dispersing potato strips in a container for continuous frying of the portions throughout their superficial surfaces and to promote escape of steam generated from the frying strips in which said receptacle includes a cover removably supported and having openings for said containers and with said walls dependent therefrom parallel with the side edges of said openings, and with said pulsative circulating means and driving means therefor supported by said cover for removal of the entire operating unit at will.

KENNETH E. BEMIS.

REFERENCES CITED

The following references are of record in the file of this patent:

UNITED STATES PATENTS

| Number | Name | Date |
|---|---|---|
| 309,720 | Kirchhoff et al. | Dec. 23, 1884 |
| 1,162,641 | Müller | Nov. 30, 1915 |
| 1,741,791 | Reck | Dec. 31, 1929 |
| 2,207,316 | Ferry | July 9, 1940 |
| 2,243,661 | Tota | May 27, 1941 |